March 25, 1969
T. W. LEAVITT
3,434,740
BUMPER HITCH
Filed Oct. 17, 1967
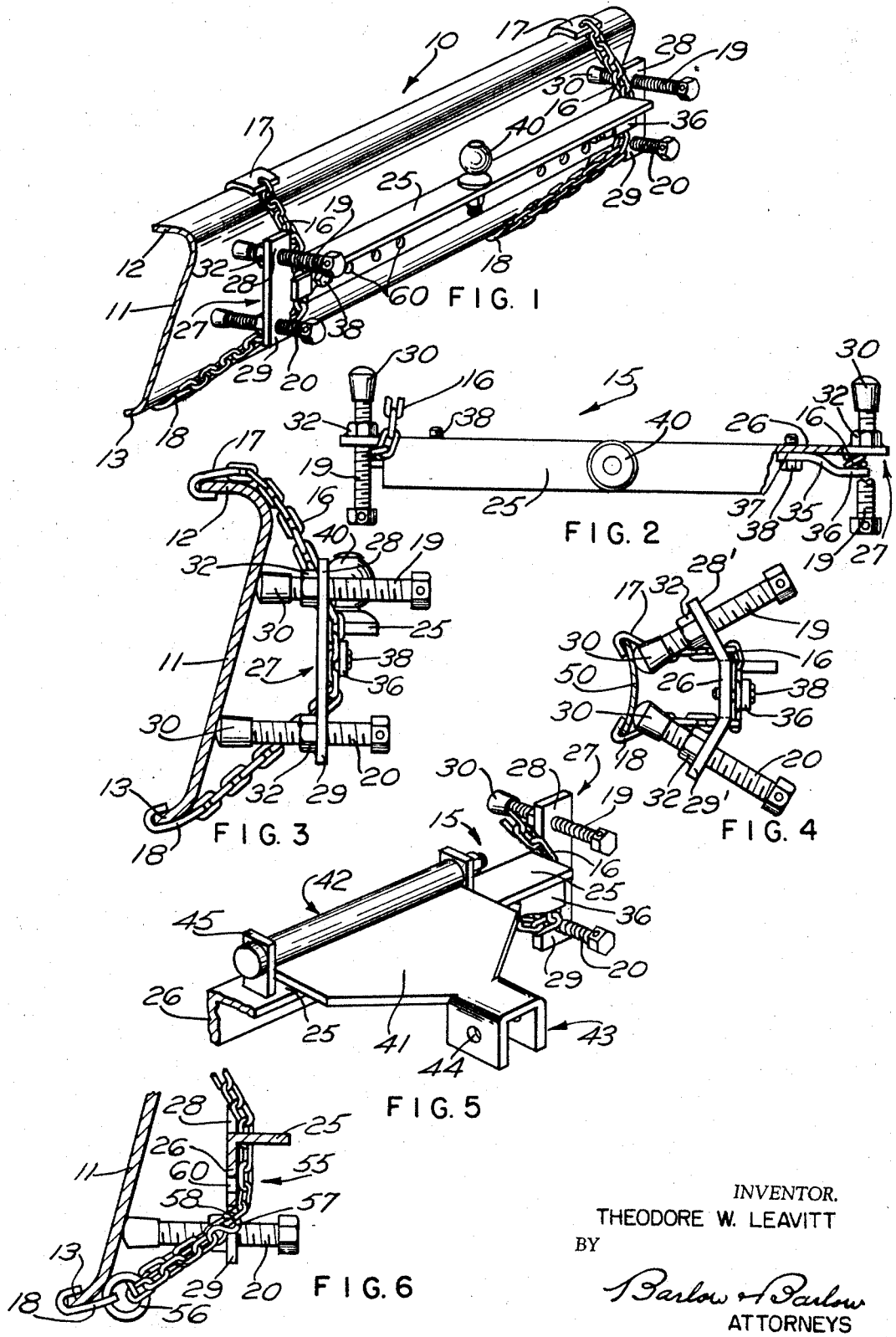
INVENTOR.
THEODORE W. LEAVITT
BY
Barlow & Barlow
ATTORNEYS

United States Patent Office 3,434,740
Patented Mar. 25, 1969

3,434,740
BUMPER HITCH
Theodore W. Leavitt, 146 Omaha Blvd.,
Warwick, R.I. 02889
Filed Oct. 17, 1967, Ser. No. 675,913
Int. Cl. B60d 1/06
U.S. Cl. 280—502                                    6 Claims

ABSTRACT OF THE DISCLOSURE

A hitch for attachment to a bumper by a pair of chains each with hooks at its opposite ends to engage the upper and lower edges of a bumper with a bar from one chain to the other which is located between the chains and the bumper, the bar having vertically spaced screws to engage the bumper for the accommodation of different shape bumpers to urge the bar away from the bumper against the chains with a sufficient pressure to hold the bar in an adjusted position.

Background of the invention

Bumpers on automotive vehicles are of various shapes and it becomes increasingly difficult to provide a bumper hitch which may be used on the various different shaped bumpers which are experienced, it being necessary to provide the proper vertical alignment of the towing means. Usually there is very little vertical adjustment and such means is exceedingly complicated.

Summary of the invention

The bumper hitch here referred to comprises two spaced chains, each chain having a hook for engaging the upper edge of the bumper and a hook for engaging the lower edge of the bumper. An angle iron bar extends between these two chains with screw means vertically arranged at each end of the bumper so that the angle iron bar may be forced away from the bumper against the chains and by reason of the vertical spacing of the screws may be angularly adjusted about a horizontal axis with respect to the bumper for proper positioning. The relation of the screws and the chain is such that the bar cannot be moved lengthwise of the bumper by reason of the screws blocking the movement of the bar.

Brief description of the drawings

FIG. 1 is a perspective view of a fragmental portion of a deeply angled back bumper with the bumper hitch of this invention in place;

FIG. 2 is a top plan view with the bumper omitted and parts cut away;

FIG. 3 is a sectional view looking endwise of the bumper;

FIG. 4 is a view similar to FIG. 3 but showing a modified formation of hitch for engaging a relatively narrow bumper;

FIG. 5 is a perspective view showing a modified form of attachment for towing; and FIG. 6 is a fragmental section view of a modified form of chain.

Description of the preferred embodiment

With reference to the drawings, 10 designates a bumper which has a face 11 angled rearwardly from the vertical as it progresses downwardly much more excessively than has generally appeared on bumpers up to the present time although is now appearing in bumpers on some automobiles. The upper edge of this bumper is curved rearwardly as at 12 forming a generally horizontal tip at right angles to the vertical while the lower edge 13 is curved rearwardly slightly.

The bumper hitch of this invention comprises a bar 15 (FIG. 2) having certain advantageous shapings at its ends as will be described and a pair of chains 16 with upper hooks 17 and lower hooks 18 which hook over the upper and lower edges of the bumper. Screws designated generally 19 and 20 serve to angularly position the bar about its longitudinal axis and tighten it in position by moving the bar away from the bumper against the chains 16.

The bar 15 is L-shaped and sometimes referred to as angle iron shape having a horizontal portion 25 and a vertical portion 26 (see FIG. 5). At the ends of the angle iron formation there are wings 27 having portions 28 extending above the angle iron and portions 29 extending below the angle iron. The chains 16 are located at the ends of the angle iron formation and engage the face of these wings on the side of the angle iron or bar which is away from the bumper 10 and then extend rearwardly toward the bumper along the inner edges of the wings. In FIGURES 1, 2, 3 and 5 the wings 27 are in the plane of the vertically extending portion 26 of the angle iron bar. The screws 19 extend through the upper portions 28 of these wings, while the screws 20 extend through the lower portions 29 of these wings. These screws are provided with crutch feet or cups 30 of resilient material to engage the bumper 10. By screwing in the screws 19 and 20 different distances that is a short distance through the wings for the screws 19 and a longer distance through the wings 29 for the screws 20, the horizontal portion 25 of the bar may be rotated about its axis to a desired plane or it may be adjusted at an angle to the horizontal plane if desired by a manipulation of the screws 19 and 20. These screws it will be understood have threaded engagement with the wings which may be reinforced by means of nuts 32 secured to the wings to provide the desired threaded bearing for the screws.

Clamps or guides consisting of offset members 35, see FIG. 2, provide a portion 36 to extend over the chain 16 and a portion 37 which may be clamped to the vertical portion 26 of the angle bar by means of a cap screw 38. These guide clamps for the chains may be left loose until the bar is suitably adjusted by means of the screws 19 and 20 and then when in position the screw 38 may be taken up to clamp the chain securely against the bar to hold it in position.

The horizontal portion 25 of the bar provides a means for securing a ball such as 40 to which a tow bar may be secured while in cases where towing of a driveless car is desired without the flexibility of the ball-like connection 40, I provide a hinge member 41 (see FIG. 5) secured to the angle bar 25 in which case the tow may be utilized for dragging another automobile where there is no driver. In this case the member 41 is hinged as at 42 to the angle bar by means of upstanding lugs 45 from the horizontal portion 25 and a channel 43 as provided for the connection of the tow bar which may pivot vertically in the opening 44.

In some cases where there is a bumper 50 of extremely narrow width such as shown in FIG. 4, the wings 27 may have their upper portions 28' and lower portions 29' angled at an obtuse angle to the portion 26 of the angle bar in which case the screws 19 and 20 will pitch inwardly to engage the narrower bumper 50 as seen in FIG. 4.

It will be seen from the above arrangement that by the use of the vertically arranged screws I may tilt the bar to which the trailing device is to be secured at a desired angle with reference to the bumper regardless of its shape thus providing accommodation for a large number of bumpers with a convenient means for mounting a towing device thereon.

In some cases instead of using chains 16 of different lengths for different sized bumpers, I may use a chain of adjustable length as seen in FIG. 6. Here the chain 55 extends from an upper hook such as 17 shown in the other view through a ring 56, which ring has hook 18 attached thereto for engaging the lower edge 13 of the bumper, and back on itself with an S link 57 attached at the end of the chain so that it may be hooked into one of the links as 58 or it may be hooked into one of the openings 60 in the vertical portion 26 of the angle iron bar to take up slack if necessary.

I claim:
1. A bumper hitch comprising
   (a) an elongated bar to extend lengthwise of a bumper
       (1) tow attaching means carried by the bar
   (b) spaced means for attaching the bar to the bumper at spaced locations each comprising
       (1) a hook to engage the upper edge of a bumper
       (2) a hook to engage the lower edge of a bumper
       (3) a flexible member extending between said hooks and engaging the bar on the side distant from the bumper
   (c) spaced wings secured to the bar and disposed generally vertically
   (d) vertically spaced screws having threaded relation with said wings to engage the bumper and urge the bar away from the bumper against the flexible members.

2. A bumper hitch as in claim 1 wherein the screws are outwardly of said flexible members to prevent shifting of the bar lengthwise of the bumper.
3. A bumper hitch as in claim 1 wherein guides for the flexible members are attached to the bar inwardly of the flexible members.
4. A bumper hitch as in claim 1 wherein guides for the flexible members are attached to the bar inwardly of the flexible members and means for moving the guides toward the bar to clamp the flexible member against the bar.
5. A bumper hitch as in claim 1 wherein the flexible member is a chain.
6. A bumper hitch as in claim 1 wherein said bar is L-shaped and each wing is at an obtuse angle to a portion of said bar to engage a relatively narrow bumper.

References Cited
UNITED STATES PATENTS 3,198,552   8/1965   Hopkins _____ 280—502
3,339,943   9/1967   Hicks _____ 280—502

LEO FRIAGLIA, *Primary Examiner.*

ROBERT R. SONG, *Assistant Examiner.*